United States Patent [19]

Hock et al.

[11] 4,214,507
[45] Jul. 29, 1980

[54] ONE-PIECE PLASTIC PISTON

[76] Inventors: Jules M. Hock, 16056 Arbela Dr., Whittier, Calif. 90603; Donald S. de Vries, Jr., 106 Pearl Ave., Balboa Island, Calif. 92662

[21] Appl. No.: 827,425

[22] Filed: Aug. 24, 1977

[51] Int. Cl.² .............................. F16J 9/00; F16J 9/08
[52] U.S. Cl. ....................................... 92/254; 92/240;
92/243; 92/249; 264/250; 264/273; 277/228;
428/423.7
[58] Field of Search ................. 92/243, 248, 249, 240,
92/241, 242, 254; 264/250, 273; 277/228, 227,
DIG. 6; 428/423

[56] References Cited
U.S. PATENT DOCUMENTS

| | | | |
|---|---|---|---|
| 1,746,733 | 2/1930 | Lamb | 92/243 |
| 1,797,781 | 3/1931 | McCaughey | 92/243 X |
| 2,295,678 | 9/1942 | Miller | 92/254 |
| 2,309,446 | 1/1943 | Ekkebus | 92/243 X |
| 2,793,921 | 5/1957 | Phipps | 92/254 X |
| 3,176,595 | 4/1965 | Schwartz | 92/243 |
| 3,179,022 | 4/1965 | Bloudoff | 92/249 X |
| 3,181,876 | 5/1965 | Felt | 92/254 X |
| 3,319,537 | 5/1967 | Pittman | 92/243 X |
| 3,802,323 | 4/1974 | Suechting | 92/249 X |
| 4,034,528 | 7/1977 | Sanders et al. | 428/151 X |
| 4,066,269 | 1/1978 | Linne | 277/228 |

Primary Examiner—Irwin C. Cohen
Attorney, Agent, or Firm—Philip M. Hinderstein

[57] ABSTRACT

A piston comprising a core molded from a rigid thermoplastic material and a seal element molded on the core from a flexible thermoplastic material to form a unitary assembly.

9 Claims, 3 Drawing Figures

ONE-PIECE PLASTIC PISTON

BACKGROUND OF THE INVENTION

1. Field of the Invention.

The present invention relates to a unitary plastic piston and, more particularly, to a simple, lightweight, long lasting plastic piston.

2. Description of the Prior Art.

In the field of pneumatic and hydraulic cylinders, accumulators, actuators, regulators, valves, and the like, a common mechanical component is a piston which reciprocates within a cylinder. Conventional pistons are made either from steel, cast iron, aluminum, or brass. The pistons reciprocate within cylinders which are also made from metal. Since it is necessary to prevent metal-to-metal contact between the same materials, the pistons and the cylinders are either made from dissimilar metals or wear rings are positioned in grooves in the piston's surface, which rings physically contact the cylinder walls and absorb the load. O-rings and gaskets positioned in other grooves in the piston surface prevent leakage between opposite sides of the piston, but normally do not absorb any of the side load.

Conventional pistons often consist of a large number of interconnected parts. Furthermore, some piston configurations also require multiple wear rings and/or seals made from rubber, plastic, leather, and the like. These separate piston and seal assemblies are expensive due to the need to manufacture each part individually. Since there are multiple components involved, assembly time is also longer and this adds to the expense. The multiple-piece seal and piston assemblies further allow for leakage paths between the individual elements. Furthermore, many seal materials do not provide for a long wear life. Where the piston is manufactured from steel or aluminum, it is quite heavy.

In order to overcome one or more of the above problems, the prior art teaches various experiments using different materials for pistons. It has been known to mold rubber and plastic materials on metal cores. It has also been known to formulate pistons from multiple plastic, rubber, and other material parts and to clamp such parts together. However, none of these attempts have provided an effective piston and seal which is lightweight and inexpensive and has a long life.

SUMMARY OF THE INVENTION

According to the present invention, there is provided a novel piston construction which solves these problems in a manner unknown heretofore. The present piston is inexpensive to manufacture and requires no assembly time. The present piston is light in weight and provides a long wear life. The present piston is a unitary assembly which does not allow for secondary leakage paths.

Briefly, the present piston comprises a core molded from a rigid thermoplastic material and a seal element molded from a flexible thermoplastic material on the core to form a unitary assembly. The seal element is held in place on the core by a mechanical lock through a series of cross holes.

OBJECTS

It is therefore an object of the present invention to provide a unitary plastic piston.

It is a further object of the present invention to provide a piston which is less expensive for the user than the cost of fabricating pistons and separately purchasing seals.

It is still a further object of the present invention to provide a piston molded from plastic to provide a much lighter assembly weight.

It is another object of the present invention to provide a one-piece piston which can be assembled into the apparatus it is used in in a far shorter time.

It is still another object of the present invention to provide a piston which does not allow for secondary leakage paths.

Another object of the present invention is the provision of a piston employing sealing lips made from high wear resistance materials which will provide a long wear life.

Still other objects, features, and attendant advantages of the present invention will become apparent to those skilled in the art from a reading of the following detailed description of the preferred embodiments constructed in accordance therewith, taken in conjunction with the accompanying drawings wherein like numerals designate like or corresponding parts in the several figures and wherein:

DESCRIPTION OF THE PREFERRED EMBODIMENTS

Figure 1:
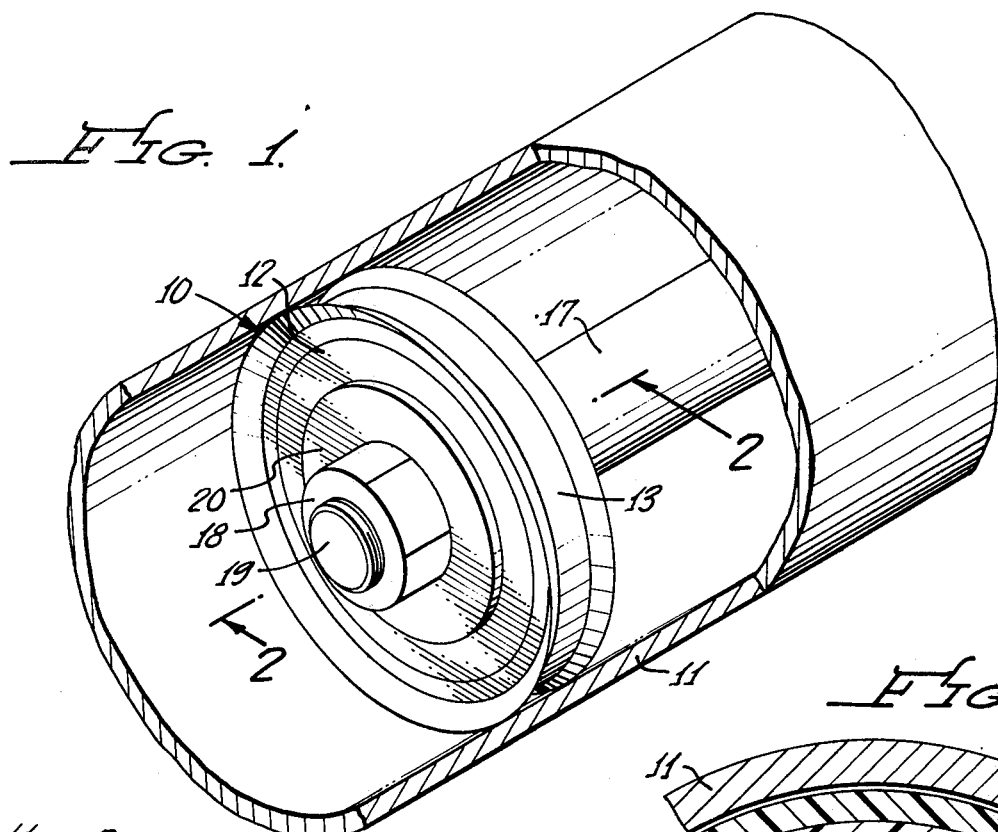
FIG. 1 is a perspective view of a piston constructed in accordance with the teachings of the present invention positioned within a cylinder.
Figure 3:
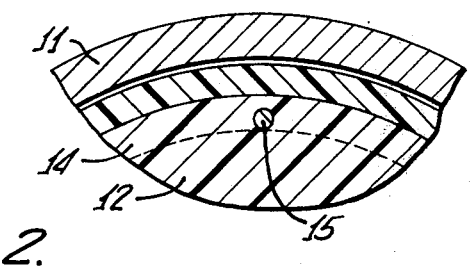
FIG. 3 is a partial sectional view taken along the line 3—3 in FIG. 2.
Figure 2:
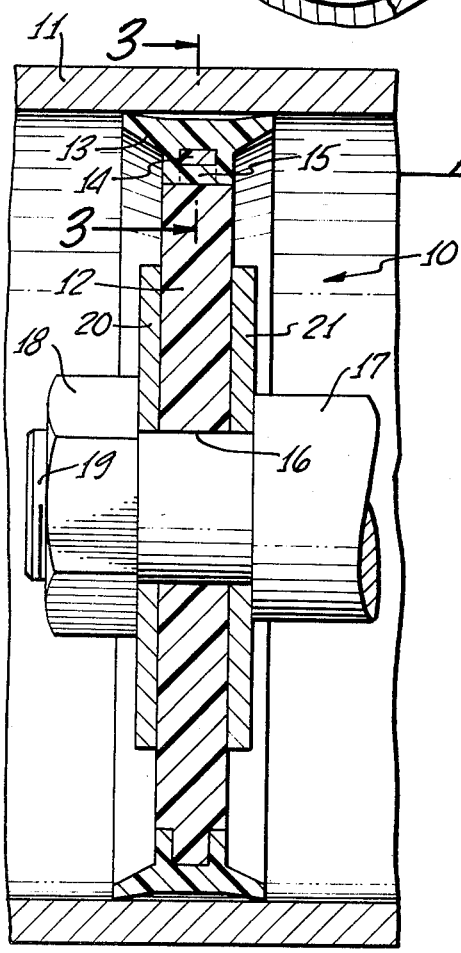
FIG. 2 is an enlarged sectional view taken along the line 2—2 in FIG. 1.

Referring now to the drawings and, more particularly, to FIGS. 1-3 thereof, there is shown a double-acting piston, generally designated 10, constructed in accordance with the teachings of the present invention. Piston 10 is suited for use in a pneumatic or hydraulic cylinder, such as cylinder 11, but is widely usable in accumulators, actuators, regulators, valves, and the like. Since the use of piston 10 is the same as conventional pistons, no discussion of such use will be provided.

Piston 10 comprises two molded components, a core 12 and a seal element 13. Core 12 is an injection molded part being made from a rigid thermoplastic material. One suitable material is nylon which may or may not be fortified with other materials to enhance its strength, depending upon the particular application. For example, it is known to fortify nylon with glass fibers to provide rigidity and strength and silicone oil and molybdinum disulfide for internal lubrication to provide a certain degree of flexibility. Other suitable materials are polyphenylene sulfide, fortified polyphenylene sulfide, polycarbonate, and fortified polycarbonate. Core 12 is molded from one of these materials in a conventional manner known to those skilled in the art.

After core 12 is molded, it is placed back into a mold and seal element 13 is molded directly thereonto. Seal element 13 is molded from a flexible, elastomeric thermoplastic material so that it can function efficiently as a seal element. Suitable materials for seal element 13 are polyurethane, a polyester thermoplastic elastomer, thermoplastic rubber, and the like.

Means must be provided for holding seal element 13 on core 12 during use. This is achieved by a mechanical lock. Core 12 is a generally disc-shaped member having a radially outwardly extending flange 14 made integral with the perimeter thereof. Extending longitudinally through flange 14 are a series of cross holes 15 which provide fluid communication between the opposite faces of flange 14. Thus, as the molten material from which seal element 13 is formed is injected into the mold, such material flows through cross holes 15. By spacing a series of holes 15 around the perimeter of seal element 12, an effective mechanical interlocking connection between seal element 13 and core 12 is formed to prevent separation of seal element 13 and core 12 in use.

Completing the description of the assembly shown in FIGS. 1–3, after piston 10 has been formed, it may be readily assembled by providing a central hole 16 for receipt of a piston rod 17. Prior to securing piston 10 to piston rod 17 by means of a nut 18 engaging the threaded end 19 of piston rod 17, a pair of washers 20 and 21 are preferrably positioned on opposite sides of piston 10. This has the effect of distributing the load from piston rod 17 over a greater area of core 12 to prevent damage thereto. Obviously, the same effect can be achieved by increasing the diameter of piston rod 17, but the use of washers 21 provides greater flexibility and lighter weight in design.

For very high pressure applications, core 12 may be fortified in a variety of different manners to increase the strength thereof. As described previously, either nylon or polyphenylene sulfide can be fortified with a variety of materials to enhance their strength. Alternatively, core 12 can be molded around a metal reinforcing ring. A similar ring could be included in piston 10.

As mentioned previously, core 12 is injection molded using conventional techniques. When seal element 13 is molded on core 12 respectively, it is important to cool the mold, such as by use of a water cooling system, as known to those skilled in the art. The reason for this is to dissipate the heat quickly so that seal element 13 cools to a temperature below the melting point of core 12 before core 12 heats to such temperature. This insures that the molding process for seal element 13 does not damage the previously molded core 12. In other words, the molding process should be designed to transfer the heat from the seal element to the mold itself rather than to the core on which it is being molded.

The advantages of a piston such as piston 10 should be immediately apparent. Because of its unitary design, piston 10 is far less expensive for the user than the cost of fabricating pistons and purchasing separate seals. By molding all of the component parts of piston 10 from plastic materials, there is provided a much lighter and smaller assembly. Since piston 10 is of a unitary construction, it can be assembled into the apparatus, such as cylinder 11, in a far shorter time. Since seal element 13 is molded and placed directly on core 12 there is far less possibility of leakage between the core and the seal element. Furthermore, since piston 10 utilizes a seal element 13 made from high wear resistance materials, it will provide a much longer life.

While the invention has been described with respect to the preferred physical embodiments constructed in accordance therewith, it will be apparent to those skilled in the art that various modifications and improvements may be made without departing from the scope and spirit of the invention. For example, a double acting piston design is possible where flange 14 extends to the inside surface of cylinder 11, and only cross holes 15 connect the opposite sides of seal element 12. Such a design would be useful in the presence of high side loads. Other configurations will be obvious to those skilled in the art. Accordingly, it is to be understood that the invention is not to be limited by the specific illustrative embodiments, but only by the scope of the appended claims.

We claim:

1. A unitary piston comprising:
   a core molded from a rigid thermoplastic material, said core consisting of a disc-shaped member having opposite sides and a radially extending flange at the perimeter thereof spaced axially inwardly from said sides, said flange having a plurality of holes extending therethrough; and
   a seal element made from a flexible thermoplastic material molded on said core, on at least opposite sides of said flange and on said perimeter, the material of said seal element extending through said holes in said flange to connect the material on said opposite sides to form a mechanical bond between said seal element and said core,
   there being no adhesion or chemical bond between said core and said seal element, said mechanical bond being the only means for holding said seal element on said core.

2. A piston according to claim 1, wherein said core is molded from nylon.

3. A piston according to claim 1, wherein said core is molded from nylon fortified with other materials to enhance its strength.

4. A piston according to claim 3, wherein said other materials include glass fibers, silicone oil, and molybdinum disulfide.

5. A piston according to claim 1, wherein said seal element is molded from polyurethane.

6. A piston according to claim 1, wherein said seal element imbeds said flange on three sides thereof.

7. A method of making a piston comprising the steps of:
   molding a core element from a rigid thermoplastic material, said core element consisting of a disc-shaped member having opposite sides and a radially extending flange at the perimeter thereof spaced axially inwardly from said sides, said flange having a plurality of holes extending therethrough;
   placing said core element in a mold without any adhesive or chemical bonding material on said core element;
   molding a seal element from a flexible thermoplastic material on said core element, on at least opposite sides of said flange and on said perimeter, the material of said seal element extending through said holes in said flange to connect the material on said opposite sides to form a mechanical bond between said seal element and said core element; and
   cooling said mold to prevent adhesion or chemical bonding of said seal element on said core element whereby said mechanical bond is the only means for holding said seal element on said core element.

8. A method of making a piston according to claim 7, wherein said core element is molded from nylon.

9. A method of making a piston according to claim 7, wherein said core element is molded from nylon fortified with other materials to enhance its strength.

* * * * *